(12) United States Patent
Caruso et al.

(10) Patent No.: US 11,604,453 B2
(45) Date of Patent: Mar. 14, 2023

(54) METHODS AND SYSTEMS FOR PROVISIONING FACTORY DEVICES WITHIN ENTERPRISE NETWORK SYSTEMS

(71) Applicant: The Boeing Company, Chicago, IL (US)

(72) Inventors: James P. Caruso, Bothell, WA (US); David R. Bowman, Charleston, SC (US); Mark J. Boyer, Placentia, CA (US); Dale R. Agajanian, Whittier, CA (US); Alexander J. Smock, Auburn, WA (US)

(73) Assignee: The Boeing Company, Chicago, IL (US)

( * ) Notice: Subject to any disclaimer, the term of this patent is extended or adjusted under 35 U.S.C. 154(b) by 274 days.

(21) Appl. No.: 16/794,446

(22) Filed: Feb. 19, 2020

(65) Prior Publication Data

US 2021/0255606 A1    Aug. 19, 2021

(51) Int. Cl.

| | |
|---|---|
| *G05B 19/418* | (2006.01) |
| *G06F 16/9035* | (2019.01) |
| *G06F 16/907* | (2019.01) |
| *G06F 16/901* | (2019.01) |
| *G06F 9/445* | (2018.01) |

(Continued)

(52) U.S. Cl.
CPC ... *G05B 19/4185* (2013.01); *G05B 19/41845* (2013.01); *G06F 9/44505* (2013.01); *G06F 12/0646* (2013.01); *G06F 16/907* (2019.01); *G06F 16/9024* (2019.01);

(Continued)

(58) Field of Classification Search
CPC ........ Y02P 90/02; Y02P 90/30; G06Q 10/06; G06Q 50/04; G05B 19/41845; G05B 19/4185

See application file for complete search history.

(56) References Cited

U.S. PATENT DOCUMENTS

| | | | |
|---|---|---|---|
| 10,095,369 B1 * | 10/2018 | Laizerovich | ............... G06F 8/38 |
| 2007/0027964 A1 * | 2/2007 | Herrod | ................ H04L 41/0889 |
| | | | 709/220 |

(Continued)

FOREIGN PATENT DOCUMENTS

EP    3360358 B1 *    7/2020    ........... H04L 63/061

*Primary Examiner* — Vincent H Tran
(74) *Attorney, Agent, or Firm* — Kwann & Olynick LLP

(57) ABSTRACT

Described are new methods and systems for provisioning factory devices in enterprise network systems using specially configured Factory Device Provisioning (FDP) portals, FDP modules, which is used for supporting various operations of the FDP portals, and enterprise device management (EDM) modules. In some examples, an EDM module stores a device-information set (e.g., an asset tag), while an FDP module stores a device-location list and a device profile, corresponding to a certain factory device. An FDP portal allows a user, through a user interface provided by the DRP portal, to retrieve and review this information without directly interacting with the EDM module. The FDP portal then allows the user to initiate a device enrollment request for the factory device. The FDP module generates a device-configuring information, which is presented by the FDP portal and used for connecting the factory device to the enterprise network system.

20 Claims, 11 Drawing Sheets

(51) Int. Cl.
 *G06F 12/06* (2006.01)
 *G06F 21/62* (2013.01)
(52) U.S. Cl.
 CPC .......... *G06F 16/9035* (2019.01); *G06F 21/62* (2013.01); *G06F 21/629* (2013.01)

(56) References Cited

U.S. PATENT DOCUMENTS

| | | | |
|---|---|---|---|
| 2014/0181521 A1* | 6/2014 | Hemphill | H04L 9/0819 709/219 |
| 2017/0308344 A1* | 10/2017 | Furihata | G06F 3/147 |
| 2020/0213841 A1* | 7/2020 | Berdy | H04L 9/3234 |
| 2021/0157305 A1* | 5/2021 | Ratilla | G06F 16/2379 |
| 2022/0100159 A1* | 3/2022 | Plessing | G06F 9/547 |

\* cited by examiner

METHODS AND SYSTEMS FOR PROVISIONING FACTORY DEVICES WITHIN ENTERPRISE NETWORK SYSTEMS

BACKGROUND

Various portable computing devices with communication capabilities, such as smartphones, cellular phones, and personal digital assistants, have grown in popularity for various applications. Such devices have also entered factory environments and are currently being used to assist or are directly involved in various fabrication, quality control, inventory management, and other like factory operations. For example, such devices are used to deliver instructions to factory personnel, receive and process various production-related data, monitor execution of production processes, and perform various other production-related functions. Unlike consumer devices, factory devices tend to be more diverse (e.g., both from software and hardware perspectives), which presents various challenges to provisioning these devices within large enterprise network systems, often associated with factory environments. Additional challenges to provisioning factory devices, in comparison to, e.g., consumer mobile electronics, come from specific configurations of factory devices, access control, and large scale manufacturing facilities, among other factors. Manual provisioning processes, which are currently employed in most factory environments, tend to be slow and result in various issues.

SUMMARY

Described are new methods and systems for provisioning factory devices in enterprise network systems using specially configured Factory Device Provisioning (FDP) portals, FDP modules, which is used for supporting various operations of the FDP portals, and enterprise device management (EDM) modules. In some examples, an EDM module stores a device-information set (e.g., an asset tag), while an FDP module stores a device-location list and a device profile, corresponding to a certain factory device. An FDP portal allows a user, through a user interface provided by the DRP portal, to retrieve and review this information without directly interacting with the EDM module. The FDP portal then allows the user to initiate a device enrollment request for the factory device. The FDP module generates a device-configuring information, which is presented by the FDP portal and used for connecting the factory device to the enterprise network system.

In some examples, a method of provisioning a factory device within an enterprise network system of provided. The enterprise network system comprises an FDP portal, an FDP module, and an EDM module. The method comprises requesting, by the FDP portal and from the EDM module, device deployment information corresponding to the factory device. The method the proceeds with receiving and displaying, at the FDP portal, the device deployment information. The method further comprises retrieving, by the FDP portal and from the FDP module, a device location list corresponding to the factory device and also retrieving, by the FDP portal and from the FDP module, a device profile corresponding to the factory device. The method proceeds with receiving, at the FDP portal, a device enrollment request for the factory device. The method then proceeds with generating, by the FDP module, a device-configuring information, for connecting the factory device to the enterprise network system.

Also provided is an FDP system for provisioning a factory device within an enterprise network system. The FDP system comprises an FDP portal, operable to request from an EDM module, device deployment information that corresponds to the factory device, to retrieve a device location list and a device profile that also corresponds to the factory device, and to receive a device enrollment request for the factory device. The FDP system also comprises an FDP module, operable to store and produce based on request from the FDP portal the device location list and the device profile corresponding that corresponds to the factory device and to generate a device-configuring information, for connecting the factory device to the enterprise network system.

Also provided is a computer-readable medium on which instructions are encoded for carrying out operations for a method of provisioning a factory device within an enterprise network system. The enterprise network system comprises an FDP portal, an FDP module, and an EDM module. The method comprises requesting, by the FDP portal and from the EDM module, device deployment information corresponding to the factory device. The method the proceeds with receiving and displaying, at the FDP portal, the device deployment information. The method further comprises retrieving, by the FDP portal and from the FDP module, a device location list corresponding to the factory device and also retrieving, by the FDP portal and from the FDP module, a device profile corresponding to the factory device. The method proceeds with receiving, at the FDP portal, a device enrollment request for the factory device. The method then proceeds with generating, by the FDP module, a device-configuring information, for connecting the factory device to the enterprise network system.

DETAILED DESCRIPTION

Figure 1A:
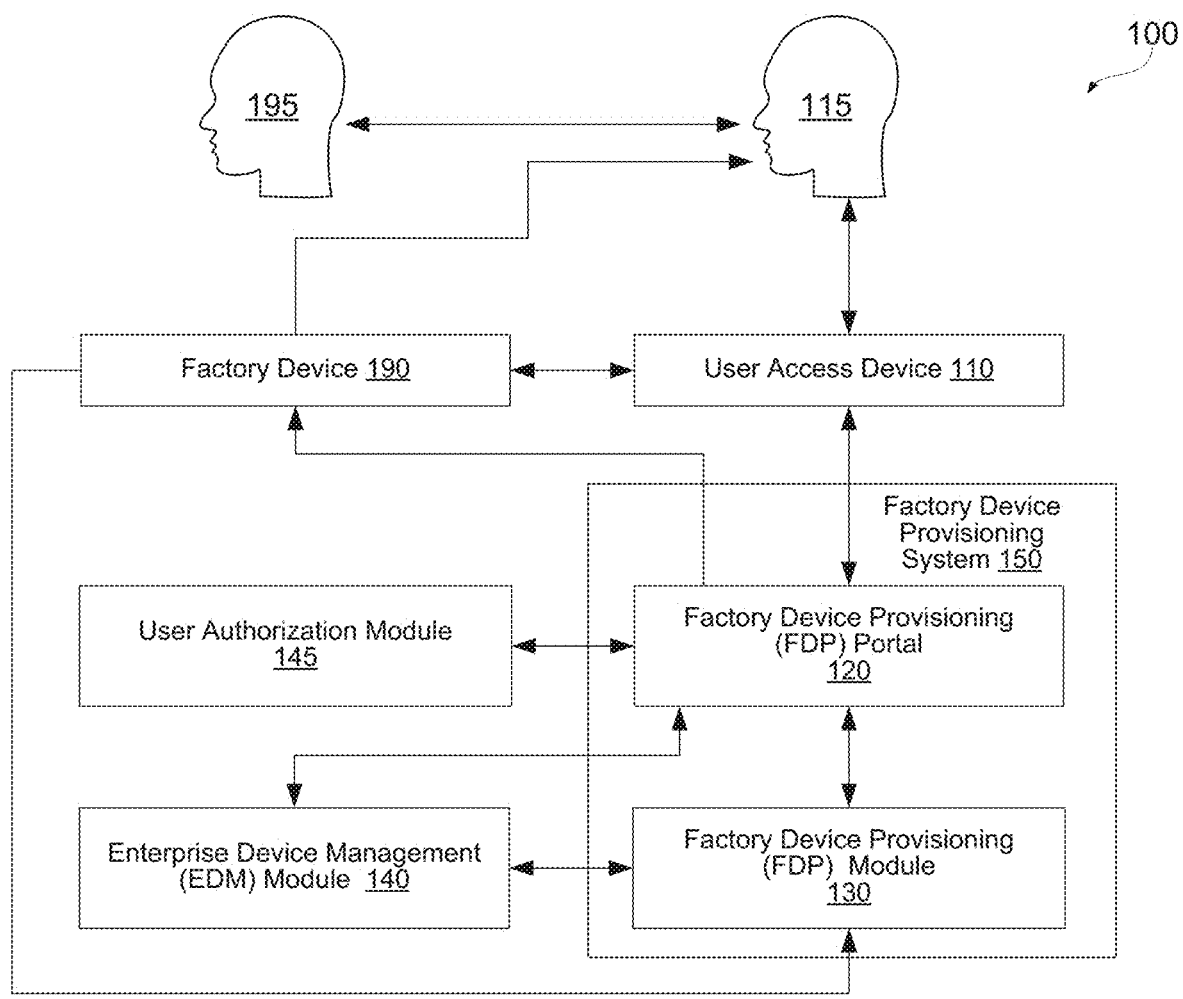
FIG. 1A is a schematic representation of an enterprise network system, comprising an FDP portal, an FDP module, and an EDM, and used for provisioning a factory device, in accordance with some examples.

In the following description, numerous specific details are set forth in order to provide a thorough understanding of the presented concepts. In some examples, the presented concepts are practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Introduction

Various mobile computing devices with communication capabilities have gained popularity on factory floors. In addition to a variety of communication and business-related functions (e.g., emailing, internet browsing, and instant messaging), factory devices are able to deliver various operating instructions, perform quality control functions, and other like functions that require interaction with manufacturing management systems or other internet protocol (IP) enabled network devices. In some examples, factory devices are specifically tailored to unique operations performed on a factory floor, such as delivering/receiving work instructions, employee communications, and facilitate interaction with other cyber physical systems within the boundary of the factory floor. In general, a factory device is a ruggedized network-capable mobile device. Some specific examples include, but are not limited to, specially-configured barcode scanners, rugged mobile phones, tablets, augmented and virtual reality headsets, kiosks, as well as a slew of emerging IP enabled technology products that are typically associated with the Industry 4.0 and Industrial Internet of Things (IIOT) protocols. Unlike consumer devices, such as smartphones, factory devices tend to be more diverse (even in the same organization, e.g., an aircraft manufacturer) and are subject to more stringent requirements.

Deployment, management, and configuration of factory devices by a factory is collectively referred to as "provisioning of factory devices". In comparison to consumer devices with limited capabilities and less restrictive operations, provisioning of factory devices present various new challenges. As noted above, factory devices tend to be more diverse. Furthermore, the number and variety of factory device types may be changing in the same factory environment. Finally, configurations of the same factory device may be changing due to new factory operations. Overall, provisioning of factory devices cannot be supported by conventional mobile device management (MDM) systems.

Described methods and systems utilize a distributed device management model. An additional distribution level, in comparison to conventional MDM systems, is provided by an FDP system, which is a part of the overall enterprise network system. The FDP system comprises an FDP portal (e.g., for accessing by device provisioners) and an FDP module (e.g., for supporting operations of the FDP portal and/or providing the backend functionality of the FDP system). The FDP system provides a highly granular control over factory device provisioning, e.g., allocating a specific factory device profile, at a specific factory location, for a specific user. This control is achieved without allowing and providing access to users across to the entire enterprise, which greatly enhances security of the overall enterprise network system.

For example, an aircraft manufacturer utilizes various factory devices deployed on a factory floor for various aspects and stages of its manufacturing, e.g., for communication among manufacturing personnel, provide information of manufacturing processes, control manufacturing equipment, and the like. Deployment of factory devices in such environments greatly benefits from the additional distribution level of the described methods and systems. These methods and systems reduce and, in many cases, eliminate the need for manual operations, which significantly slows down the overall process and potentially introduces new issues, e.g., human errors.

Described methods and systems utilize FDP portals and FDP modules to implement various operations of factory device provisioning. An FDP portal is assessed by a device provisioner, e.g., using a user access device. It should be noted that the user access device, used for provisioning operations, is different from a factory device, which is being provisioned. The FDP portal then requests a device-information set (e.g., an asset tag), associated with the factory device from an EDM module. The FDP portal also retrieves a device location list and a device profile, corresponding to the factory device, from the FDP module. This information is used by the device provisioner to initialize a device enrollment request, which is processed by the FDP portal and the FDP module to generate a device-configuring information, such as a barcode or, more specifically, a device-configuring barcode. For example, the device-configuring barcode is presented on the FDP portal. The device-configuring information (e.g., barcode) is then used by the device provisioner to configure the factory device before issuing this device to a user.

These methods and systems allow offloading most of device management tasks to FDP portals and FDP modules. Specifically, an FDP portal and an FDP module are parts of an enterprise network system, which also comprises, e.g., an EDM module and a user authorization module. A specific combination of these modules, described herein, provides unique device support associated with factory environments and security. Some additional aspects of enterprise network system include managing updates (e.g., operating system updates, application updates), segregating data, securing data, enforcing corporate policies, and the like. For example, an enterprise network system, described herein, ensures that a diverse set of factory devices is configured in accordance with specific factory and process requirements, authorized users, and security policies.

System Examples

FIG. 1A is a schematic representation of enterprise network system 100, in accordance with some examples. As further described below, enterprise network system 100 is used for provisioning factory device 190, which is a part of factory device 190. Other functions of enterprise network system 100 include information technology (IT) capabilities (e.g., applications, end user services, enterprise systems, and other common IT capabilities). It should be noted that provisioning of factory device 190 does not interfere with these other functions. Furthermore, device provisioner 115 does not have access to other modules and functions of enterprise network system 100. This separation and isolation is provided by an additional distribution level in enterprise network system 100.

Referring to FIG. 1A, enterprise network system 100 comprises FDP portal 120, FDP module 130, EDM module 140, and user authentication module 145. These modules enable various features of enterprise network system 100, which are described below with reference to FIGS. 2 and 3. In some examples, FDP portal 120 and FDP module 130 are integrated into FDP system 150, which provides an additional distribution level in enterprise network system 100 and separates provisioning operations from other functions of enterprise network system 100. FDP portal 120 may be referred to as a front-end of FDP system 150, while FDP module 130 may be referred to as a back end.

FIG. 1A also illustrates user access device 110, which is used by device provisioner 115 to access and interacts with FDP portal 120 during various operations of the overall provisioning processes. In some examples, device provisioner 115 is different from end user 195 of factory device 190. For example, end user 195 is a factory-floor worker, in charge of production, quality control, and other such functions. Device provisioner 115 is an information technology (IT) staff, who is specifically tasked with provisioning factory device 190, when requested by end user 195. Furthermore, user access device 110 should be distinguished from factory device 190. User access device 110 is any suitable device with communication, processing, and input/output (I/O) capabilities, such as a desktop, laptop, tablet, smart phone, and the like. User access device 110 connects and interacts with FDP portal 120. Specifically, FDP portal 120 provides user interface 122, one example of which is shown in FIG. 1B.

Figure 1B:
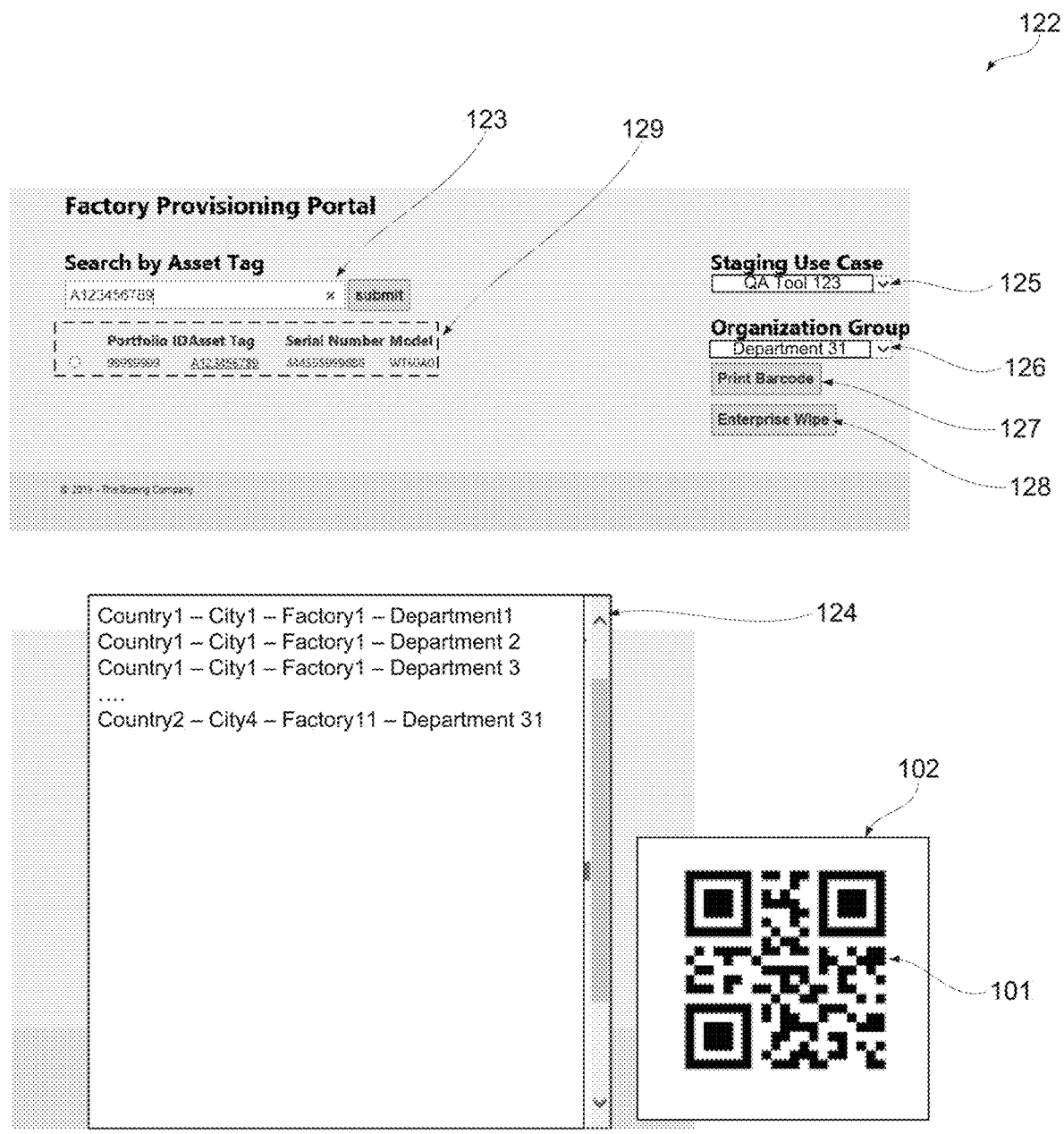
FIG. 1B is an example of an FDP portal, generated by the FDP module and displayed on a user access device, wherein the FDP portal is used for presenting device information, device location list, and device profile, corresponding to the factory device, and receiving various inputs from a device provisioner.

Referring to FIG. 1B, user interface 122 comprises various fields for displaying information related to provisioning of factory device 190. One example of these fields is asset tag field 123. As further described below with reference to FIGS. 2 and 4A, an asset tag is retrieved by FDP portal 120 from FDP module 130. The asset tag corresponds to one or more factory devices. Another example of the user interface fields is device location field 124, which is used to present a device location list. As further described below with reference to FIGS. 2 and 4B, a device location list is retrieved by FDP portal 120 from FDP module 130. Specifically, FDP portal 120 quires FDP module 130 for organization group records, corresponding to factory device 190. The device location list is a linked list, showing a parent-child relationship between any pair of the organization group records.

Yet another example of the user interface fields is device profile field 125, which is used to present a device profile. As further described below with reference to FIGS. 2 and 4C, a device profile is retrieved by FDP portal 120 from FDP module 130. Specifically, FDP portal 120 quires FDP module 130 for contextually relevant device configuration profiles, corresponding to factory device 190. If a staging use case is found at FDP module 130, the process proceeds with sorting through the contextually relevant device configuration profiles thereby forming the device profile and presenting this profile in device profile field 125.

Yet another example of the user interface fields is organization assignment field 126. The organizational group assignment represents a logical representation of a factory location and the corresponding security and device policies, device configuration details, and device connectivity instructions that are necessary and restricted to that isolated environment.

Other fields of user interface 122 include barcode request field 127 and metadata cleanup field 128, which will be further described below with reference to FIGS. 2 and 3. Finally, user interface 122 comprises barcode field for displaying device—configuring barcode 101. In some examples, device—configuring barcode 101 is scanned from a display of user access device 110, e.g., by an optical scanner/camera of factory device 190 to configure factory device 190 in accordance with information, encoded with device—configuring barcode 101.

Other modules of enterprise network system 100 are user authentication module 145 and EDM module 140. User authentication module 145 is accessed by FDP portal 120 to authenticate user information provided by device provisioner 115. This authentication process determines whether remaining provisioning operations can proceed. In some examples, different authentication levels determine different types of factory devices, different factory locations, and/or different configurations for factory devices.

EDM module 140 provides device deployment information, corresponding to factory device 190 to FDP portal 120. Furthermore, EDM module 140 is configured to receive an asset tag of factory device 190 and identifying one or more matching records in a database, available at or connected to EDM module 140.

Method Examples

Figure 2:
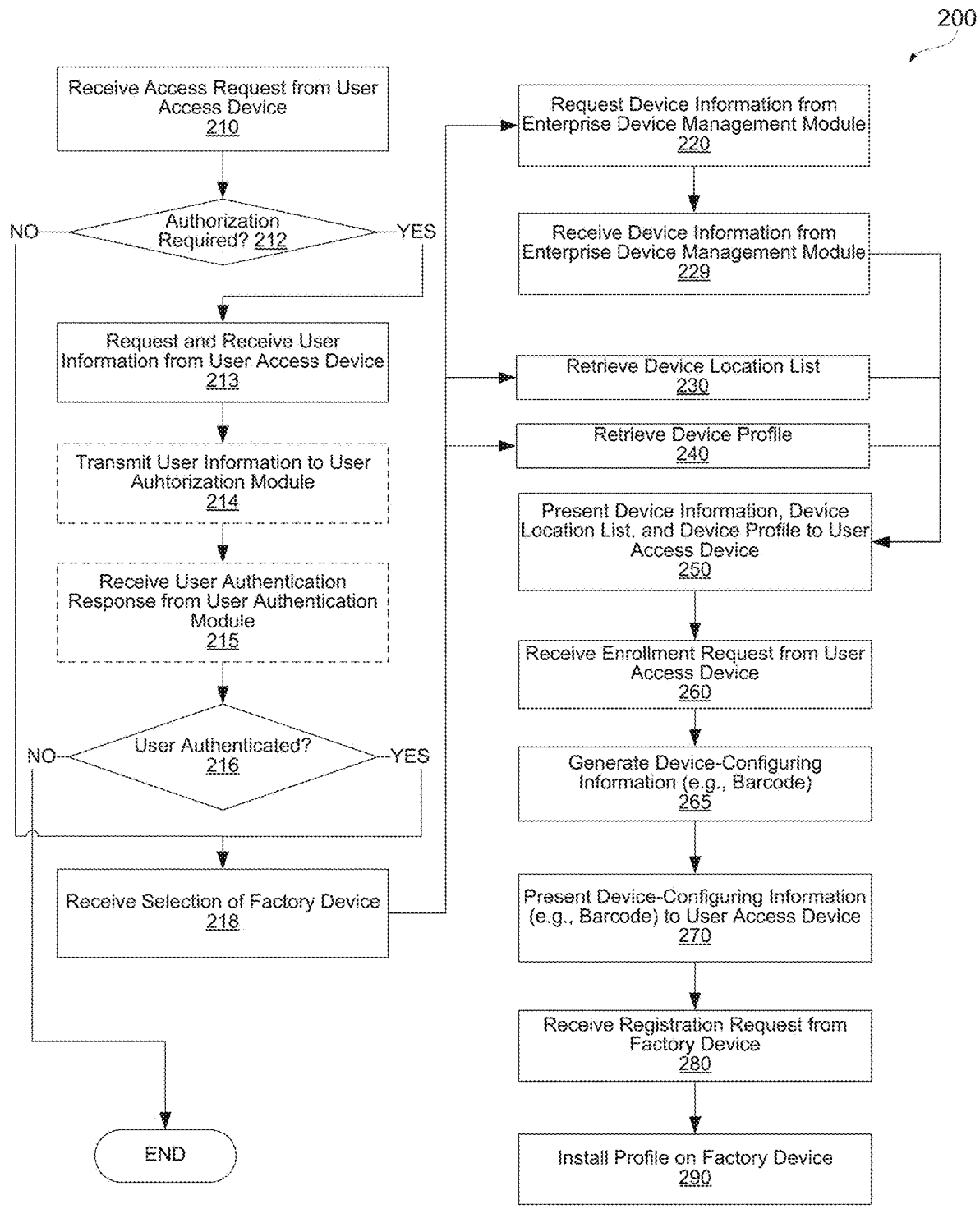
FIG. 2 is a process flowchart corresponding to a method of provisioning a factory device within an enterprise network system, in accordance with some examples.

FIG. 2 is a process flowchart corresponding to method 200 of provisioning factory device 190 within enterprise network system 100. Various examples of factory device 190 and enterprise network system 100 are described above. In some examples, enterprise network system 100 comprises FDP portal 120, FDP module 130, and EDM module 140. FIG. 3 illustrates a corresponding process flowchart and also links various operations to specific modules of enterprise network system 100.

Figure 3:
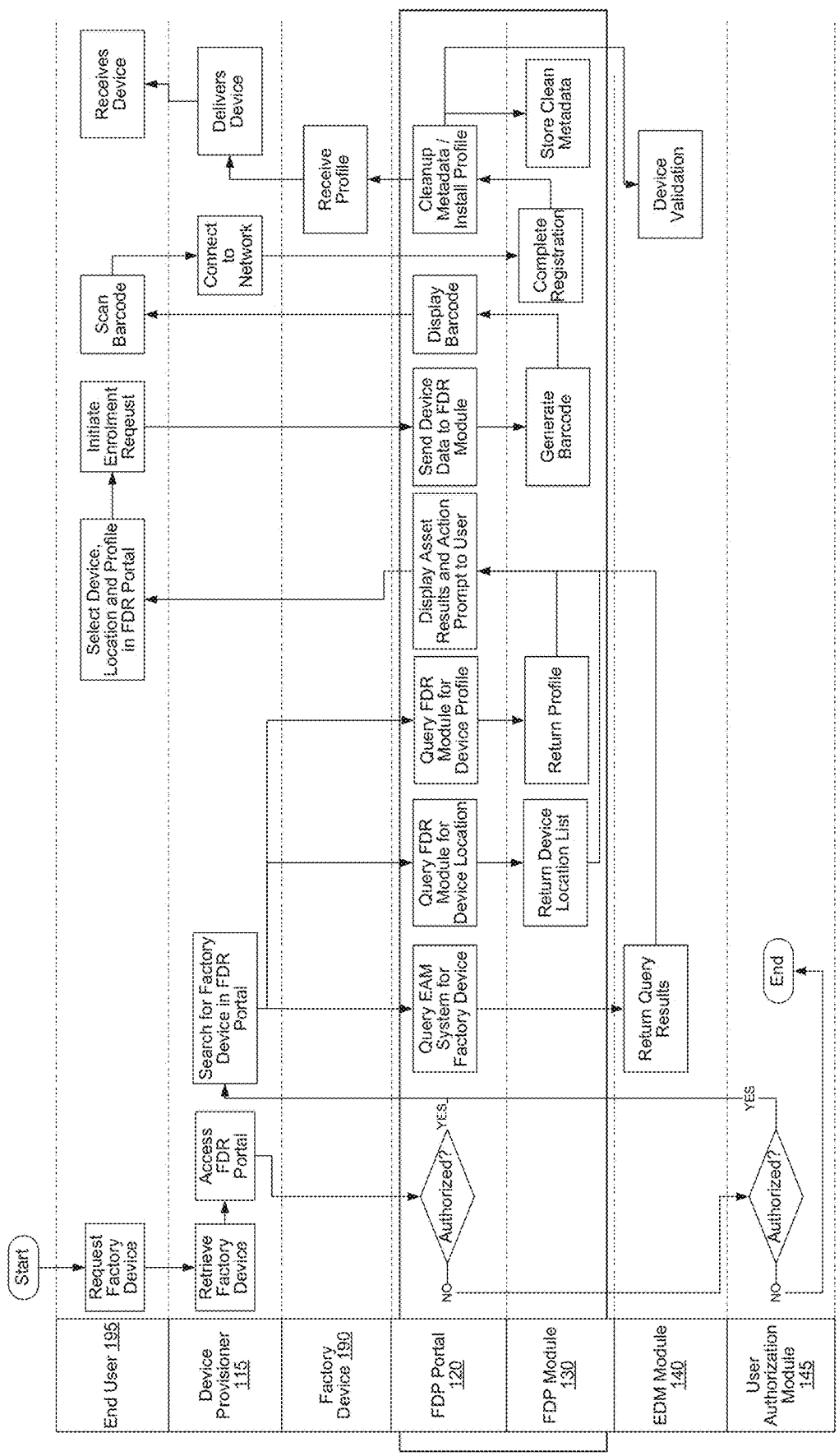
FIG. 3 is a schematic representation of various operations of the method shown in FIG. 2, and various modules of the enterprise network system of FIG. 1A, performing these operations, in accordance with some examples.

The overall process starts with end user 195 requesting factory device 190 from device provisioner 115, as, e.g., is schematically shown in FIG. 3. For example, a factory worker, or representative of a factory worker, submits a device request to a service providing organization for a work area within the factory. Device provisioner 115 then proceeds with an actual/physical retrieval of factory device 190, e.g., from a storage, a factory location, and the like. At this point, factory device 190 is not assigned to or configured based on the needs of end user 195. In other words, factory device 190 is not yet provisioned for end user 195.

As shown in FIG. 3, device provisioner 115 accesses FDP portal 120 for provisioning of factory device 190. This operation may be performed with user access device 110, which accesses FDP portal 120. In some examples, the access starts with authorization device provisioner 115. Referring to FIG. 2, method 200 comprises receiving (block 210) an access request from user access device 110 and at FDP portal 120. In response to the access request and if authorization is required (block 212), FDP portal 120 requests and receives (block 213) a set of user information from user access device 110. For example, device provisioner 115 enters some type of login information (e.g., user name and password). In some examples, FDP portal 120 is configured to perform authentication of the user information internally, i.e., at FDP portal 120. For example, user authentication module 145 is a part of FDP portal 120 or at least FDP module 130.

Alternatively, FDP portal 120 transmits (block 214) the user information to user authentication module 145 for authentication. In some examples, user authentication module 145 is shared by other modules of enterprise network system 100 and used for other authentication requests, which are not parts of factory device provisioning. FDP portal 120 then receives (block 215) an authentication response from user authentication module 145.

In either example, if the user information is authenticated (block 216), method 200 proceeds with receiving (block 218) factory device selection from device provisioner 115 or, more specifically, from user access device 110. The factory device identification is received by FDP portal 120. For example, user interface 122, provided by FDP portal 120, presents various device options. In some examples, these options are selected based on the authentication of the user information, described above. For example, FDP module 130 comprises an internal database of device attributes with a certain degree of volatility. FDP portal 120 another database with less volatile attributes, e.g., associated to the device locations and profiles.

Referring to FIG. 2, method 200 comprises requesting (block 220) device information corresponding to factory device 190. This operation is performed by FDP portal 120, based on the factory device identification, received from device provisioner 115. The device information is requested from EDM module 140. Some examples of the device information include, but are not limited to, device name, manufacturer information, manufacturer serial number, enterprise asset identifier, operating system, and other configurable attributes. Additional details of this operation will now be described with reference to FIG. 4A.

Figure 4A:
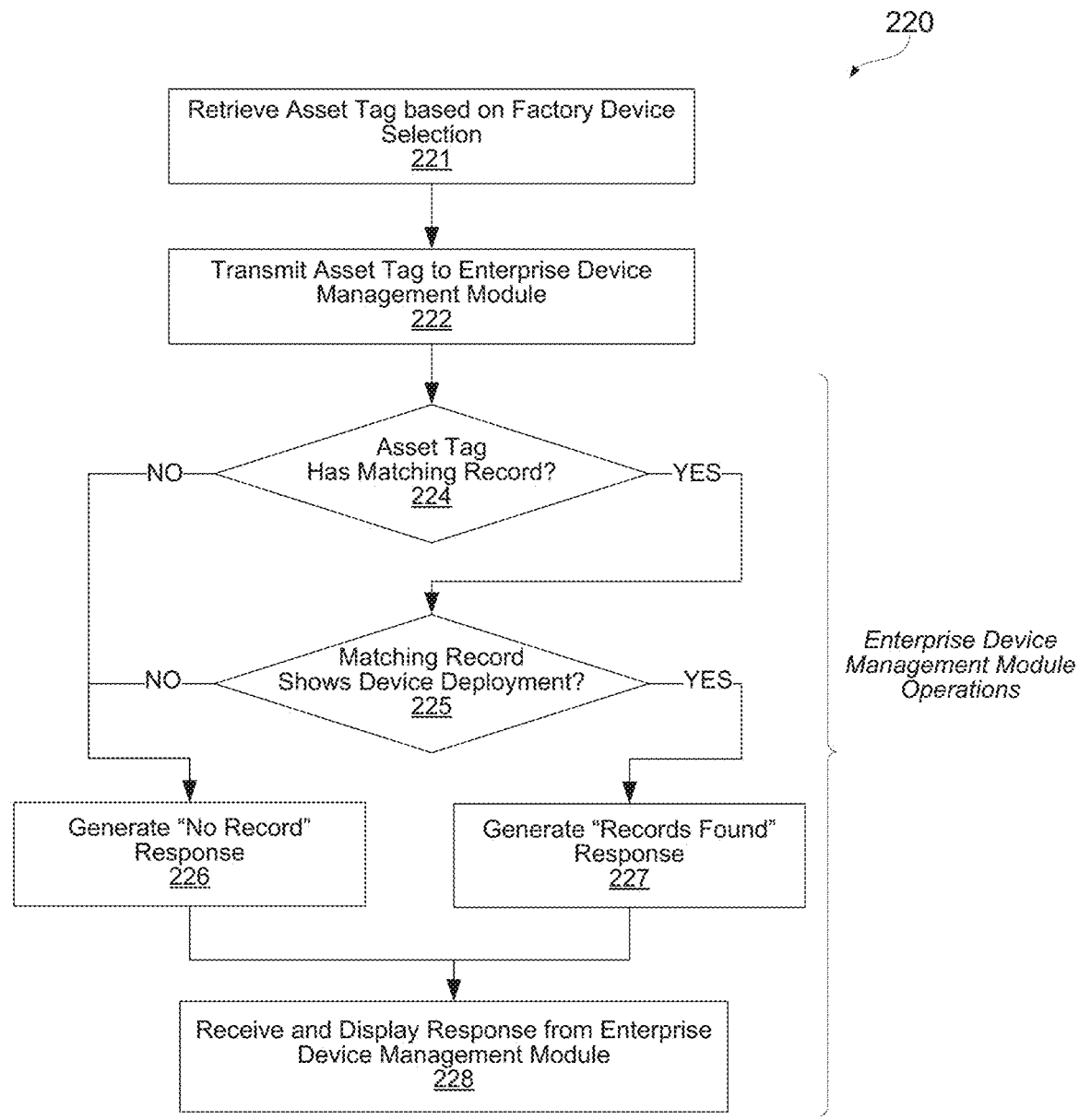
FIG. 4A is a process flowchart corresponding to requesting device deployment information corresponding to a factory device, in accordance with some examples.

Referring to FIG. 4A, in some examples, method 200 or, more specifically, requesting (block 220) the device information comprises retrieving (block 221) an asset tag or other identification of factory device 190. Other examples of identification include, but are not limited to, manufacturer serial number and model number, operating system, and display name for the device. This requesting device information operation is performed by FDP portal 120. If the asset tag is available, the asset tag is retrieved from FDP module 130. In some examples, the asset tag is presented to device provisioner 115, e.g., by displaying the asset tag on user interface 122 as, for example, is shown in FIG. 1B.

Referring to FIG. 3A, method 200 further comprises transmitting (block 222) the asset tag of factory device 190 from FDP portal 120 and to EDM module 140. Specifically, the asset tag is transmitted to EDM module 140 for identifying one or more matching records, corresponding to the asset tag. Some examples of these matching records include, but are not limited to, manufacturer serial number and model number, operating system, and display name for the device.

As shown in FIG. 4A, EDM module 140 underdoes determining (block 224) any records matching to the asset tag. If there any matching records, EDM module 140 determines, from these records, if the records show deployment of factory device 190 (block 225). The significance of the deployment status indicates whether or not the factory device been validated and approved to be added to the production network.

If there are no matching records or the matching records indicate that factory device 190 has not been deployed, then EDM module 140 generates a no-record response (block 226). Alternatively, if the identified matching records show deployment of factory device 190, then EDM module 140 generates a records-found response (block 227). In either case, the response is sent by EDM module 140 to FDP portal 120 (block 228).

Referring to FIG. 2, method 200 comprises receiving and displaying (block 229) the device deployment information. As noted above, the device deployment information is received at FDP portal 120 from EDM module 140. In some examples, FDP portal 120 displays the results in device deployment field 124 of user interface 122.

Referring to FIG. 2, method 200 comprises retrieving (block 230) a device location list, corresponding to factory device 190. The device location list is requested by FDP portal 120 and from FDP module 130. For example, a device location list comprises a collection of device metadata. The device location list is a full list of deployable factory locations where the device can be used and connected to a factory network.

Figure 4B:
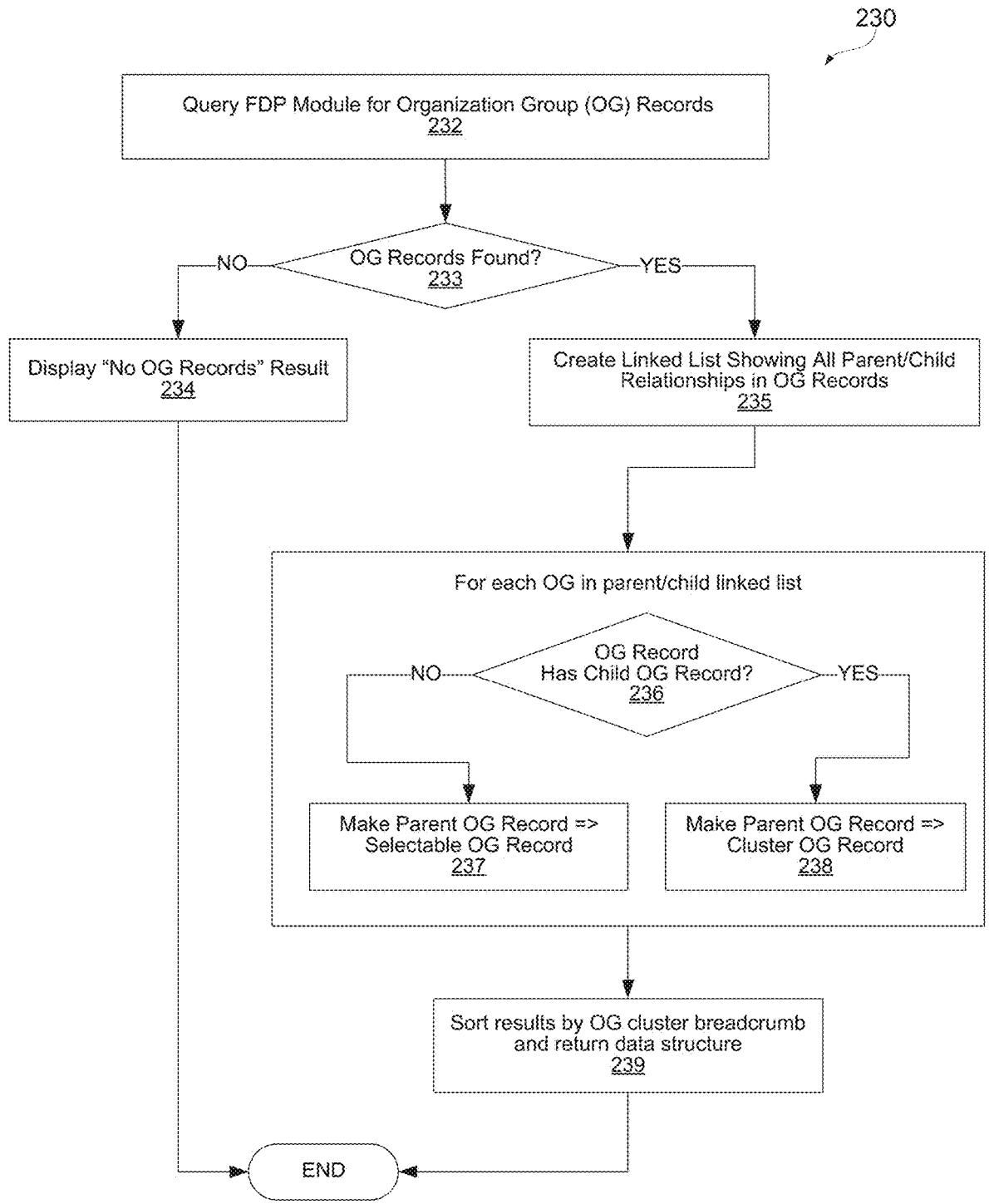
FIG. 4B is a process flowchart corresponding to retrieving a device location list corresponding to a factory device, in accordance with some examples.
Figure 4C:
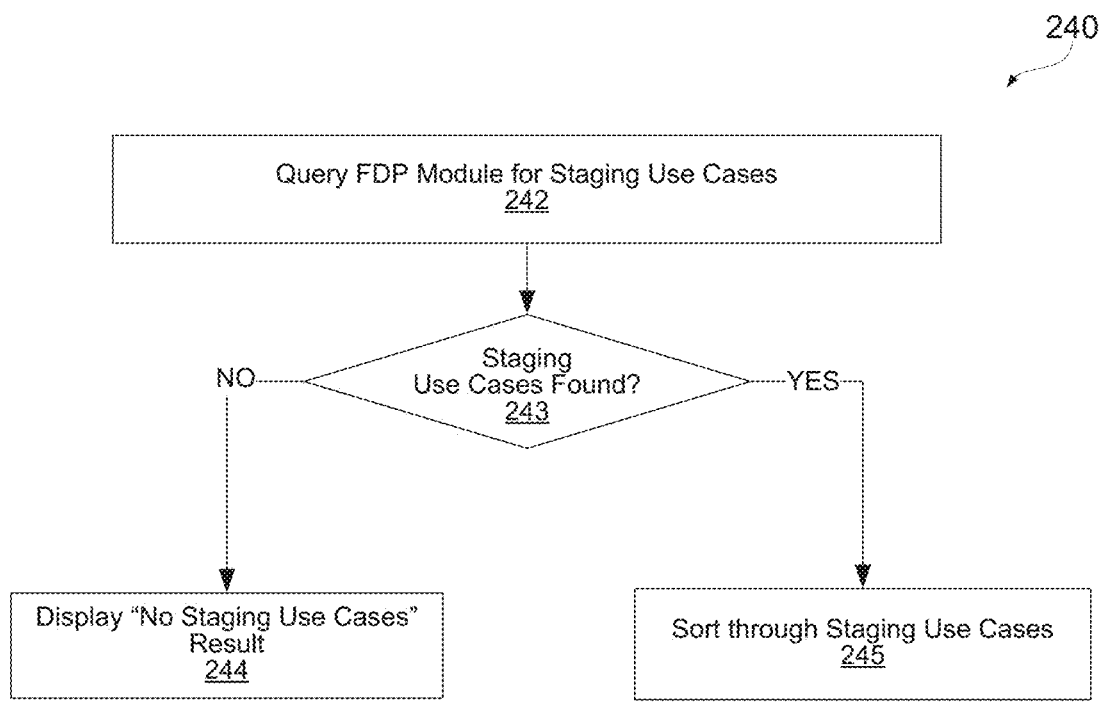
FIG. 4C is a process flowchart corresponding to retrieving a device profile corresponding to a factory device, in accordance with some examples.

Additional details of this operation will now be described with reference to FIG. 4B. FDP portal 120 queries (block 232) FDP module 130 for organization group records. The organization group records correspond to factory device 190. Some examples of the organization group records include, but are not limited to, hierarchical groupings of similar factory components across factory locations that designate access control zones for devices. If at least one of organization group records is found (block 233) at FDP module 130, method 200 continues with creating (block 235) a linked list, showing a parent-child relationship between any pair of organization group records. For example, a parent container may have lower level organization group members that have requirements for more refined factory network controls. Method 200 continues with identifying each parent record with a corresponding child record (block 236) in the created linked list. Any such parent record is identified as one of cluster organization group records (block 238). Any remaining records, without a corresponding child record, in the inked list are identified selectable organization group records (block 237). Method 200 continues with sorting (block 239) the linked list using the selectable organization group records and the cluster organization group records, thereby creating an organization group data structure, representing device location list. Alternatively, if no organization group records are found (block 233) at FDP module 130, FDP module 130 returns a no-records result (block 234) back to FDP portal 120.

Referring to FIG. 2, method 200 comprises retrieving (block 240), a device profile corresponding to factory device 190. In some examples, the device profile comprises device enrollment and configuration profiles, wireless network profiles, time-zone profiles, and secure launcher profiles.

The device profile is retrieved by FDP portal 120 and from FDP module 130. Additional details of this operation will now be described with reference to FIG. 4C. FDP portal 120 queries (block 242) FDP module 130 for staging use cases. Some examples of the staging use cases include, but are not limited to, individual use, application, or region within an organization group. If at least one of staging use cases is found (block 243) at FDP module 130, method 200 continues with sorting (block 245) through the identified use cases. Alternatively, if no use cases are found (block 243) at FDP module 130, FDP module 130 returns a no-use-cases result (block 244) back to FDP portal 120.

It should be noted that operations represented by block 220, block 230, and block 240 are performed in parallel. As such, the response time of FDP portal 120 is significantly improved in comparison to, e.g., sequential operations.

Referring to FIG. 2, method 200 comprises presenting (block 250) device information, device location list, and device profile. This operation is performed by FDP portal 120, e.g., on user interface 122. Specifically, any retrieved device information is shown in device information field 129, the device location list is shown field 124, and the device profile is shown in use case field.

Referring to FIG. 2, method 200 comprises receiving (block 260) a device enrollment request for factory device 190. In some examples, a device enrollment request comprises grouping of syntactically matched enrolled or enrollable devices. The device enrollment request is received at FDP portal 120. The device enrollment request is triggered, for example, by device provisioner 115 clicking on barcode request field 127 on user interface 122 provided by FDP portal 120.

Figure 4D:
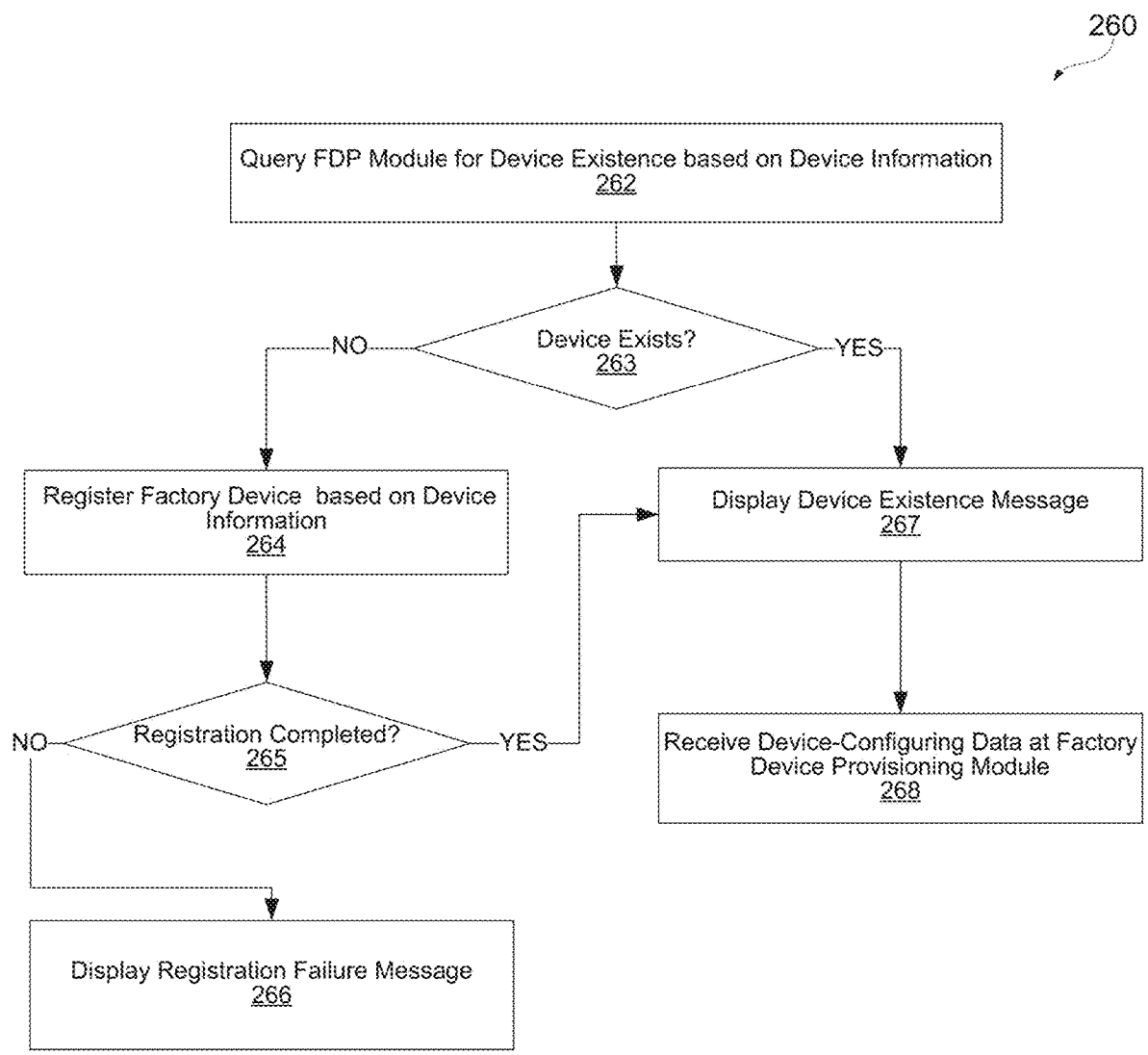
FIG. 4D is a process flowchart corresponding to receiving a device enrollment request for a factory device, in accordance with some examples.

Additional details of this operation will now be described with reference to FIG. 4D. Specifically, in some examples, method 200 or, more specifically, the enrollment request receiving operation (block 260) comprises querying (block 262) FDP module 130 for device existence records, corresponding to factory device 190. This operation is performed by FDP portal 120. Referring to decision block 263, if at least one device existence record is found, method 200 proceeds with displaying (block 267) the device existence message by FDP portal 120, e.g., on user interface 122. Method 200 then proceeds with receiving (block 268), at FDP module 130, a barcode data for generating device-configuring information, such as device-configuring barcode 101. Alternatively, if at least no device existence records are not found, method 200 proceeds with registering (block 264) factory device 190 using the device information. This operation is performed by FDP module 130. If the registration operation (decision block 264) is complete, method 200 proceed with receiving the displaying operation (block 267) and the receiving operation (block 268), described above. Alternatively, if the registration operation (decision block 264) is not complete, FDP portal 120 displays (block 266) a registration failure message.

Referring to FIG. 2, method 200 comprises generating (block 265) device-configuring information, such as device-configuring barcode 101, for connecting factory device 190 to enterprise network system 100. This operation is performed by FDP module 130. The barcode generation uses the friendly name of the device, the enterprise asset identifier, and the device's manufacturer serial number. In some examples, barcode 101 encodes grouping of syntactically matched enrolled or enrollable devices.

Referring to FIG. 2, method 200 comprises presenting (block 270) device-configuring information, such as device-configuring barcode 101. For examples, device-configuring barcode 101 is presented by FDP portal 120, e.g., in barcode field 102 of user interface 122.

Figure 4E:
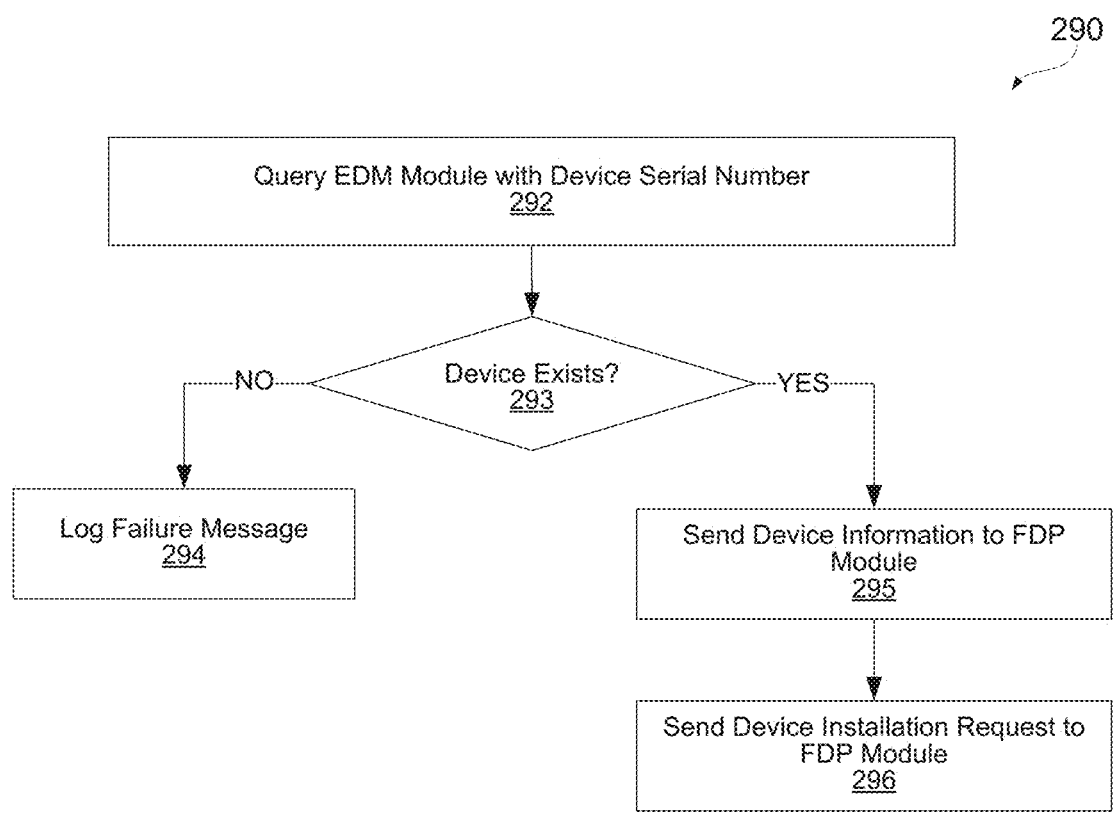
FIG. 4E is a process flowchart corresponding to installing a device profile on a factory device, in accordance with some examples

In some examples, method 200 further comprises receiving (block 280), at FDP portal 120, a registration request for factory device 190 and installing (block 290), by FDP portal 120, device profile on factory device 190. Additional details of this operation will now be described with reference to FIG. 4E. As shown, method 200 or, more specifically, installing (block 290) the device profile on factory device 190 comprises querying (block 292) EDM module 140 for a device identifier, corresponding to factory device 190. This operation is performed by FDP portal 120. If the device identifier is present (block 293), method 200 proceeds with sending (block 295) the device installation information to FDP module 130 and also sending (block 296) a device installation request to FDP module 130. Alternatively, method 200 proceeds with logging a failure message (block 294).

Computer System Examples

Figure 5:
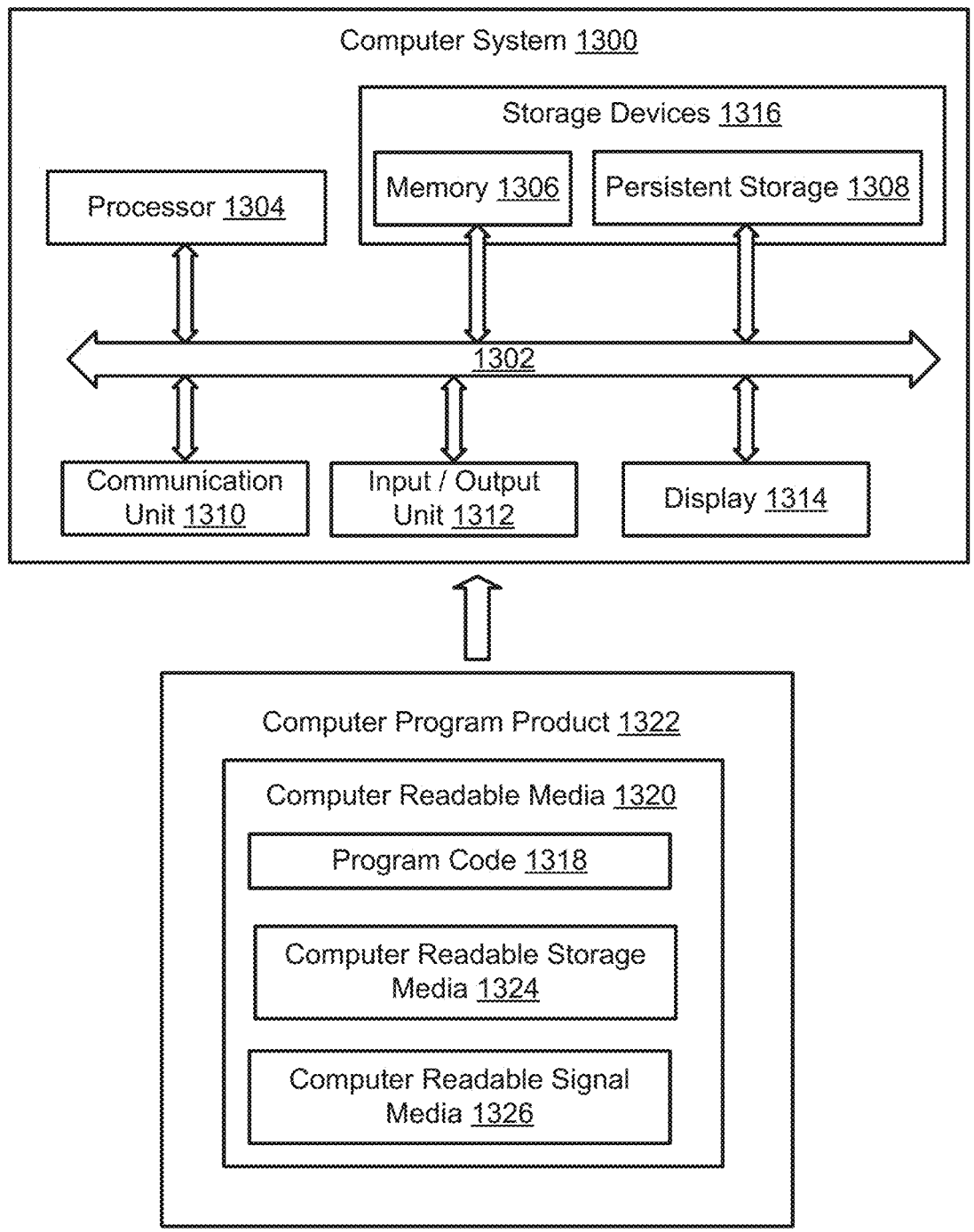
FIG. 5 is a schematic representation of a computer system, operable as one of components of the system for provisioning a factory device within an enterprise network system, in accordance with some examples.

FIG. 5 illustrates computer system 1300 and computer program product 1322, configured in accordance with some examples. Various components of system 100 described above are implementable as and supportable by components of computer system 1300 and computer program product 1322.

In various examples, computer system 1300 includes communications framework 1302, which provides communications between processor unit 1304, memory 1306, persistent storage 1308, communication unit 1310, input/output unit 1312, and display 1314. In this example, communications framework 1302 takes form of a bus system.

Processor unit 1304 serves to execute instructions for software that is loaded into memory 1306. Memory 1306 and persistent storage 1308 are examples of storage devices 1316. A storage device is any piece of hardware capable of storing information, such as, for example, without limitation, data, program code in functional form, and/or other suitable information either on a temporary basis and/or a permanent basis. Storage devices 1316 are also referred to as computer readable storage devices in these illustrative examples. Memory 1306, in these examples, is a random access memory or any other suitable volatile or non-volatile storage device. Persistent storage 1308 takes various forms, depending on implementation. For example, persistent storage 1308 is a hard drive, a flash memory, a rewritable optical disk, a rewritable magnetic tape, or some combination of above. Media used by persistent storage 1308 is removable, in some examples.

Communications unit 1310, in these illustrative examples, provides for communications with other computer systems or devices. In these illustrative examples, communications unit 1310 is a network interface card, universal serial bus (USB) interface, or other suitable communications device/interface.

Input/output unit 1312 allows for input and output of data with other devices that are connected to computer system 1300. For example, input/output unit 1312 provides a connection for user input through a keyboard, a mouse, and/or some other suitable input device. Further, input/output unit 1312 sends output to a printer. Display 1314 provides a mechanism to display information to a user.

In some examples, instructions for an operating system, applications, and/or programs are located in storage devices 1316, which are in communication with processor unit 1304 through communications framework 1302. Processes of different examples are performed by processor unit 1304 using computer-implemented instructions, which are located in a memory, such as memory 1306.

These instructions are referred to as program code, computer usable program code, or computer readable program code that is read and executed by a processor in processor unit 1304. Program code in different examples is embodied on different physical or computer readable storage media, such as memory 1306 or persistent storage 1308.

Program code 1318 is located in a functional form on computer readable media 1320 that is selectively removable and is loaded onto or transferred to computer system 1300 for execution by processor unit 1304. Program code 1318 and computer readable media 1320 form or provide computer program product 1322 in these illustrative examples. In one example, computer readable media 1320 is or includes computer readable storage media 1324 or computer readable signal media 1326.

In these illustrative examples, computer readable storage media 1324 is a physical or tangible storage device used to store program code 1318 rather than a medium that propagates or transmits program code 1318.

Alternatively, program code 1318 is transferred to computer system 1300 using computer readable signal media 1326. Computer readable signal media 1326 is, for example, a propagated data signal, containing program code 1318. For example, computer readable signal media 1326 is an electromagnetic signal, an optical signal, and/or any other suitable type of signal. These signals are transmitted over communications links, such as wireless communications links, optical fiber cable, coaxial cable, a wire, and/or any other suitable type of communications link.

The different components illustrated for computer system 1300 are not meant to provide architectural limitations to manner in which different examples are implemented. Different illustrative examples are implemented in a computer system including components in addition to and/or in place of those illustrated for computer system 1300. Other components shown in FIG. 5 can be varied from illustrative examples shown.

Aircraft Examples

In some examples, methods and systems described above are used on aircraft and, more generally, by the aerospace industry. Specifically, these methods and systems can be used during fabrication of aircraft as well as during aircraft service and maintenance.

Figure 6:
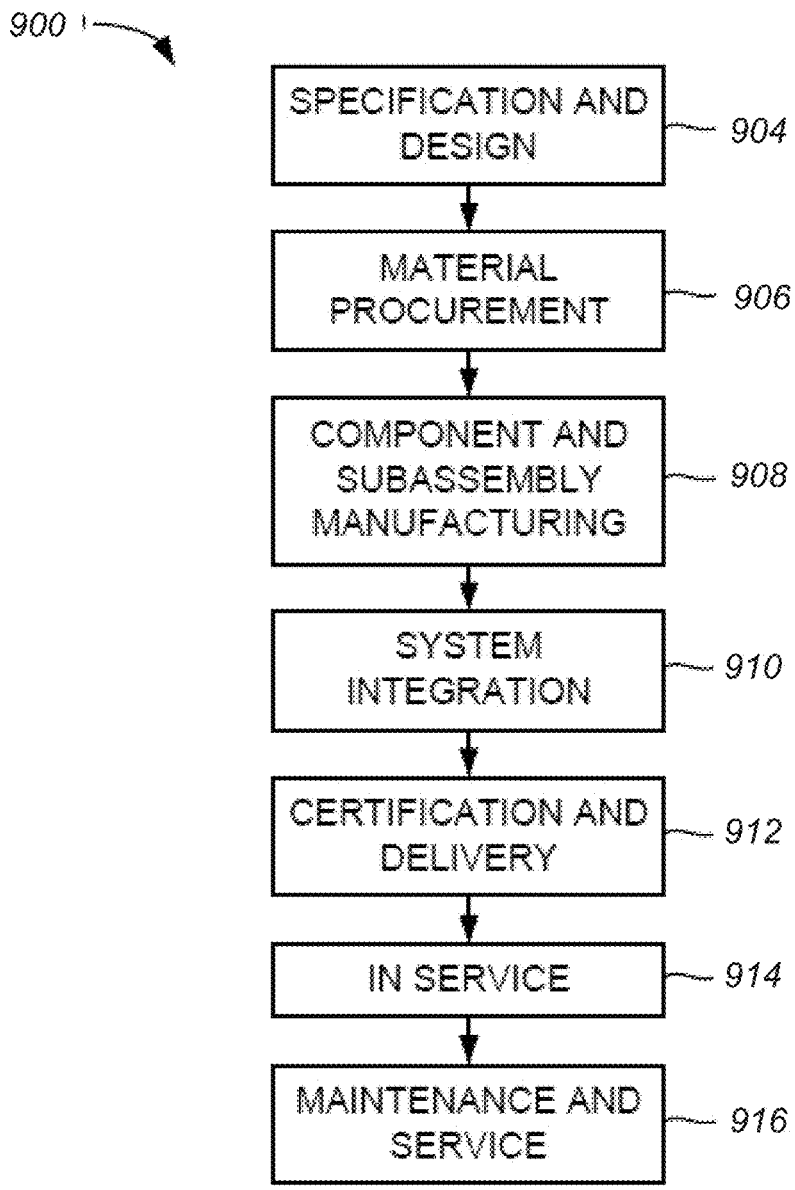
FIG. 6 is a process flowchart corresponding to a method for manufacturing and service the aircraft.
Figure 7:
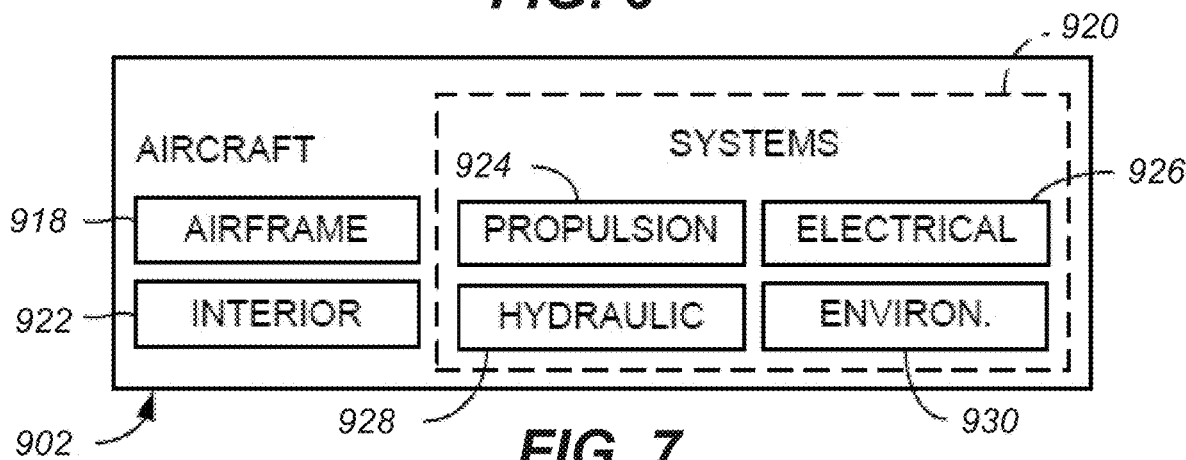
FIG. 7 illustrates a block diagram of an example of an aircraft, in accordance with some examples.

Accordingly, the apparatus and methods described above are applicable for aircraft manufacturing and service method 900 as shown in FIG. 6 and for aircraft 902 as shown in FIG. 7. During pre-production, method 900 includes specification and design 904 of aircraft 902 and material procurement 906. During production, component and subassembly manufacturing 908 and system integration 910 of aircraft 902 takes place. Thereafter, aircraft 902 goes through certification and delivery 912 in order to be placed in service 914. While in service by a customer, aircraft 902 is scheduled for routine maintenance and service 916, which also includes modification, reconfiguration, refurbishment, and so on.

In some examples, each of the processes of method 900 is performed or carried out by a system integrator, a third party, and/or an operator, e.g., a customer. For the purposes of this description, a system integrator includes without limitation any number of aircraft manufacturers and major-system subcontractors; a third party includes without limitation any number of venders, subcontractors, and suppliers; and an operator can be an airline, leasing company, military entity, service organization, and so on.

As shown in FIG. 7, aircraft 902 produced by method 900 includes airframe 918 with plurality of systems 920, and interior 922. Examples of systems 920 include one or more of propulsion system 924, electrical system 926, hydraulic system 928, and environmental system 930. Any number of other systems can be included. Although an aerospace example is shown, the principles of the examples described herein is applied to other industries, such as the automotive industry.

Apparatus and methods presented herein can be employed during any one or more of the stages of method 900. For example, components or subassemblies corresponding to manufacturing 908 are fabricated or manufactured in a manner similar to components or subassemblies produced while aircraft 902 is in service. Also, one or more apparatus examples, method examples, or a combination thereof is utilized during manufacturing 908 and system integration 910, for example, by substantially expediting assembly of or reducing the cost of an aircraft 902. Similarly, one or more of apparatus examples, method examples, or a combination thereof is utilized while aircraft 902 is in service, for example and without limitation, to maintenance and service 916.

Further Examples

Further, description includes examples according to following clauses:

Clause 1. Method 200 of provisioning factory device 190 within enterprise network system 100, comprising FDP portal 120, FDP module 130, and EDM module 140, method 200 comprising:

requesting, by FDP portal 120 and from EDM module 140, device deployment information corresponding to factory device 190;

receiving and displaying, at FDP portal 120, the device deployment information;

retrieving, by FDP portal 120 and from FDP module 130, a device location list, corresponding to factory device 190;

retrieving, by FDP portal 120 and from FDP module 130, a device profile, corresponding to factory device 190;

receiving, at FDP portal 120, a device enrollment request for factory device 190; and generating, by FDP module 130, a device-configuring information, for connecting factory device 190 to enterprise network system 100.

Clause 2. Method 200 of clause 1, wherein requesting the device deployment information comprises:

retrieving, by FDP portal 120 and from FDP module 130, an asset tag of factory device 190;

transmitting, from FDP portal 120 and to EDM module 140, the asset tag of factory device 190 for identifying one or more matching records; and receiving, at FDP portal 120 and from EDM module 140, a response corresponding to the identification of the asset tag of factory device 190.

Clause 3. Method 200 of clause 2, wherein the response, corresponding to the identification of the asset tag of factory device 190, depends on the asset tag of factory device 190 matching one of enterprise unique device identifiers available at EDM module 140.

Clause 4. Method 200 of clause 2, wherein the response, corresponding to the identification of the asset tag of factory device 190, depends a device deployment record, corresponding to the asset tag of factory device 190.

Clause 5. Method 200 of any one of clauses 1-4, wherein retrieving the device location list comprises:

querying, by FDP portal 120, FDP module 130 for organization group records, corresponding to factory device 190; and if at least one of organization group records is found at FDP module 130, creating a linked list, showing a parent-child relationship between any pair of organization group records, and identifying each parent record, without a corresponding child record, in linked list as one of selectable organization group records, identifying any remaining record, with a corresponding child record, in linked list as one of cluster organization group records, and sorting linked list using selectable organization group records and cluster organization group records, thereby creating an organization group data structure, representing device location list.

Clause 6. Method 200 of any one of clauses 1-5, wherein retrieving the device profile comprises:

querying, by FDP portal 120, FDP module 130 for contextually relevant device configuration profiles, corresponding to factory device 190; and if a staging use case is found at FDP module 130, sorting through the contextually relevant device configuration profiles thereby forming the device profile.

Clause 7. Method 200 of any one od clauses 1-6, wherein receiving the device enrollment request comprises:

quering, by FDP portal 120, FDP module 130 for device existence records, corresponding to factory device 190; and if at least one of device existence records is found, receiving, at FDP module 130 the device-configuring information for generating a device-configuring barcode.

Clause 8. Method 200 of clause 7, wherein, if no device existence records are found, receiving the device enrollment request further comprises:

registering, by FDP module 130, factory device 190 using device information; and if registering factory device 190 is complete, receiving, at FDP module 130 the device-configuring information for generating a device-configuring barcode.

Clause 9. Method 200 of any one of clauses 1-8, further comprising:

receiving, at FDP portal 120, a registration request for factory device 190; and installing, by FDP portal 120, device profile on factory device 190.

Clause 10. Method 200 of clause 9, wherein installing the device profile on factory device 190 comprises:

querying, by FDP portal 120, EDM module 140 for a device identifier, corresponding to factory device 190; and if the device identifier is presented in EDM module 140, sending device installation information to FDP module 130 and sending a device installation request to FDP module 130.

Clause 11. Method 200 of any one of clauses 1-10, further comprising:

receiving, at FDP portal 120, an access request from a user access device 110;

requesting and receiving, at FDP portal 120, user information from user access device 110; and authenticating the access request based on the user information.

Clause 12. Method 200 of any one of clauses 1-11, wherein factory device 190 is selected one of enrolled and unenrolled ruggedized, network capable mobile devices in the enterprise network system.

Clause 13. Method 200 of any one of clauses 1-12, wherein the device location list, retrieved by FDP portal 120 and from FDP module 130, comprises a collection of device metadata.

Clause 14. Method 200 of any one of clauses 1-13, wherein the device profile, retrieved by FDP portal 120 and from FDP module 130, comprises device enrollment and configuration profiles.

Clause 15. Method 200 of any one of clauses 1-14, wherein the device enrollment request, transmitted by FDP portal 120, comprises grouping of syntactically matched enrolled or enrollable devices.

Clause 16. Method 200 of any one of clauses 1-15, wherein the device-configuring information, presented by FDP portal 120, comprises device-configuring barcode, which encodes grouping of syntactically matched enrolled or enrollable devices.

Clause 17. Method 200 of any one of clauses 1-16, wherein requesting the device information, retrieving the device location list, and retrieving the device profile are performed in parallel.

Clause 18. Method 200 of any one of clauses 1-17, further comprising presenting, by FDP portal 120, the device information, the device location list, and the device profile.

Clause 19. Method 200 of any one of clauses 1-18, further comprising presenting, by FDP portal 120, the device-configuring barcode comprising a device-configuring barcode.

Clause 20. FDP system 150 for provisioning factory device 190 within enterprise network system 100, FDP system 150 comprising:

FDP portal 120, operable to request from EDM module 140, device deployment information, corresponding to factory device 190, to retrieve a device location list and a device profile, corresponding to factory device 190, and to receive a device enrollment request for factory device 190; and FDP module 130, operable to store and produce based on request from FDP portal 120 device location list and device profile, corresponding to factory device 190, and to generate a device-configuring information, for connecting factory device 190 to enterprise network system 100.

21. Computer-readable medium, on which instructions are encoded for carrying out operations of provisioning factory device 190 within enterprise network system 100, comprising FDP portal 120, FDP module 130, and EDM module 140, method 200 comprising:

requesting, by FDP portal 120 and from EDM module 140, device deployment information corresponding to factory device 190;

receiving and displaying, at FDP portal 120, the device deployment information;

retrieving, by FDP portal 120 and from FDP module 130, a device location list, corresponding to factory device 190;

retrieving, by FDP portal 120 and from FDP module 130, a device profile, corresponding to factory device 190;

receiving, at FDP portal 120, a device enrollment request for factory device 190; and generating, by FDP module 130, a device-configuring information, for connecting factory device 190 to enterprise network system 100.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A method of provisioning a factory device within an enterprise network system, comprising a Factory Device Provisioning (FDP) portal, an FDP module, and an enterprise device management (EDM) module, the method comprising:

requesting, by the FDP portal and from the EDM module, device deployment information corresponding to the factory device;

receiving and displaying, at the FDP portal, the device deployment information;

retrieving, by the FDP portal and from the FDP module, a device location list, corresponding to the factory device;

retrieving, by the FDP portal and from the FDP module, a device profile, corresponding to the factory device;

receiving, at the FDP portal, a device enrollment request for the factory device; and generating, by the FDP module, a device-configuring information, for connecting the factory device to the enterprise network system, wherein receiving the device enrollment request comprises:
  querying, by the FDP portal, the FDP module for device existence records, corresponding to the factory device;
  if at least one of the device existence records is found, receiving, at the FDP module the device configuring information for generating a device-configuring barcode, and
  if no device existence records are found, registering, by the FDP module, the factory device using the device information and then receiving, at the FDP module the device configuring information for generating a device-configuring barcode.

2. The method of claim 1, wherein requesting the device deployment information comprises:
  retrieving, by the FDP portal and from the FDP module, an asset tag of the factory device;
  transmitting, from the FDP portal and to the EDM module, the asset tag of the factory device for identifying one or more matching records; and
  receiving, at the FDP portal and from the EDM module, a response corresponding to identification of the asset tag of the factory device.

3. The method of claim 2, wherein the response, corresponding to the identification of the asset tag of the factory device, depends on the asset tag of the factory device matching one of enterprise unique device identifiers available at the EDM module.

4. The method of claim 2, wherein the response corresponding to the identification of the asset tag of the factory device depends a device deployment record corresponding to the asset tag of the factory device.

5. The method of claim 1, wherein retrieving the device profile comprises:
  querying, by the FDP portal, the FDP module for contextually relevant device configuration profiles, corresponding to the factory device; and
  if a staging use case is found at the FDP module, sorting through the contextually relevant device configuration profiles thereby forming the device profile.

6. The method of claim 1, further comprising:
  receiving, at the FDP portal, a registration request for the factory device; and
  installing, by the FDP portal, the device profile on the factory device.

7. The method of claim 6, wherein installing the device profile on the factory device comprises:
  querying, by the FDP portal, the EDM module for a device identifier, corresponding to the factory device; and
  if the device identifier is presented in the EDM module, sending device installation information to the FDP module and sending a device installation request to the FDP module.

8. The method of claim 1, further comprising:
  receiving, at the FDP portal, an access request from a user access device;
  requesting and receiving, at the FDP portal, user information from the user access device; and
  authenticating the access request based on the user information.

9. The method of claim 1, wherein the factory device is one of enrolled and unenrolled ruggedized, network capable mobile devices in the enterprise network system.

10. The method of claim 1, wherein the device location list, retrieved by the FDP portal and from the FDP module, comprises a collection of device metadata.

11. The method of claim 1, wherein the device profile, retrieved by the FDP portal and from the FDP module, comprises device enrollment and configuration profiles.

12. The method of claim 1, wherein the device enrollment request, transmitted by the FDP portal, comprises grouping of syntactically matched enrolled or enrollable devices.

13. The method of claim 1, wherein the device-configuring information, presented by the FDP portal, comprises a device-configuring barcode, which encodes grouping of syntactically matched enrolled or enrollable devices.

14. The method of claim 1, wherein requesting the device information, retrieving the device location list, and retrieving the device profile are performed in parallel.

15. The method of claim 1, further comprising presenting, by the FDP portal, the device information, the device location list, and the device profile.

16. The method of claim 1, further comprising presenting, by the FDP portal, the device-configuring information, comprising a device-configuring barcode.

17. A method of provisioning a factory device within an enterprise network system, comprising a Factory Device Provisioning (FDP) portal, an FDP module, and an enterprise device management (EDM) module, the method comprising:
  requesting, by the FDP portal and from the EDM module, device deployment information corresponding to the factory device;
  receiving and displaying, at the FDP portal, the device deployment information;
  retrieving, by the FDP portal and from the FDP module, a device location list, corresponding to the factory device;
  retrieving, by the FDP portal and from the FDP module, a device profile, corresponding to the factory device;
  receiving, at the FDP portal, a device enrollment request for the factory device; and
  generating, by the FDP module, a device-configuring information, for connecting the factory device to the enterprise network system,
  wherein retrieving the device location list comprises:
    querying, by the FDP portal, the FDP module for organization group records, corresponding to the factory device; and
    if at least one of the organization group records is found at the FDP module, creating a linked list, showing a parent-child relationship between any pair of the organization group records, and
    identifying each parent record, without a corresponding child record, in the linked list as one of selectable organization group records,
    identifying any remaining record, with a corresponding child record, in the linked list as one of cluster organization group records, and
    sorting the linked list using the selectable organization group records and the cluster organization group records, thereby creating an organization group data structure, representing the device location list.

18. An FDP system for provisioning a factory device within an enterprise network system, the FDP system comprising:
  an FDP portal, operable to request and receive from an EDM module, device deployment information, corresponding to the factory device, to retrieve a device location list and a device profile, corresponding to the factory device, and to receive a device enrollment request for the factory device; and an FDP module, operable to store and produce, based on the request at the FDP portal, the device location list and the device profile, corresponding to the factory device, and to generate a device-configuring information, for connecting the factory device to the enterprise network system, wherein the FDP portal is operable to receive the device enrollment request by:
 querying, by the FDP portal, the FDP module for device existence records, corresponding to the factory device;
 if at least one of the device existence records is found, receiving, at the FDP module the device configuring information for generating a device-configuring barcode, and
 if no device existence records are found, registering, by the FDP module, the factory device using the device information and then receiving, at the FDP module the device configuring information for generating a device-configuring barcode.

19. The FDP system of claim 18, wherein requesting the device deployment information comprises:
 retrieving, by the FDP portal and from the FDP module, an asset tag of the factory device;
 transmitting, from the FDP portal and to the EDM module, the asset tag of the factory device for identifying one or more matching records; and
 receiving, at the FDP portal and from the EDM module, a response corresponding to identification of the asset tag of the factory device.

20. A computer-readable medium, on which instructions are encoded for carrying out operations of a method of provisioning a factory device within an enterprise network system, comprising an FDP portal, an FDP module, and an EDM module, the method comprising:
 requesting, by the FDP portal and from the EDM module, device deployment information corresponding to the factory device;
 receiving and displaying, at the FDP portal, the device deployment information;
 retrieving, by the FDP portal and from the FDP module, a device location list corresponding to the factory device;
 retrieving, by the FDP portal and from the FDP module, a device profile corresponding to the factory device;
 receiving, at the FDP portal, a device enrollment request for the factory device; and
 generating, by the FDP module, a device-configuring information, for connecting the factory device to the enterprise network system,
 wherein receiving the device enrollment request comprises:
  querying, by the FDP portal, the FDP module for device existence records, corresponding to the factory device;
  if at least one of the device existence records is found, receiving, at the FDP module the device configuring information for generating a device-configuring barcode, and
  if no device existence records are found, registering, by the FDP module, the factory device using the device information and then receiving, at the FDP module the device configuring information for generating a device-configuring barcode.

* * * * *